United States Patent
Yoon et al.

(10) Patent No.: US 10,553,180 B1
(45) Date of Patent: Feb. 4, 2020

(54) DYNAMICALLY STRUCTURED PROTECTIVE FILM FOR MAXIMUM DISPLAY RESOLUTION

(71) Applicant: Facebook Technologies, LLC, Menlo Park, CA (US)

(72) Inventors: Youngshik Yoon, Cupertino, CA (US); Cheonhong Kim, Mountain View, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 15/927,896

(22) Filed: Mar. 21, 2018

(51) Int. Cl.
  *G09G 5/10* (2006.01)
  *G02B 1/14* (2015.01)
  *G02B 5/18* (2006.01)

(52) U.S. Cl.
  CPC .............. *G09G 5/10* (2013.01); *G02B 1/14* (2015.01); *G02B 5/1842* (2013.01); *G09G 2320/066* (2013.01); *G09G 2320/0626* (2013.01); *G09G 2320/0686* (2013.01)

(58) Field of Classification Search
  CPC ............. G09G 5/10; G09G 2320/0626; G09G 2320/066; G09G 2320/0686; G02B 1/14; G02B 5/1842
  USPC ........................................................ 359/566
  See application file for complete search history.

(56) References Cited

U.S. PATENT DOCUMENTS

| | | | |
|---|---|---|---|
| 5,053,771 A | 10/1991 | McDermott | |
| 8,779,346 B2 | 7/2014 | Fowler et al. | |
| 9,094,629 B2 | 7/2015 | Ishibashi | |
| 9,363,454 B2 | 6/2016 | Ito et al. | |
| 9,800,260 B1 | 10/2017 | Banerjee | |
| 2002/0067303 A1 | 6/2002 | Lee et al. | |
| 2003/0020100 A1 | 1/2003 | Guidash | |
| 2007/0013983 A1* | 1/2007 | Kitamura | G02B 5/1842 359/3 |
| 2007/0222881 A1 | 9/2007 | Mentzer | |
| 2010/0276572 A1 | 11/2010 | Iwabuchi et al. | |
| 2011/0254986 A1 | 10/2011 | Nishimura et al. | |
| 2012/0133807 A1 | 5/2012 | Wu et al. | |

(Continued)

OTHER PUBLICATIONS

U.S. Appl. No. 15/847,517, "Non-Final Office Action", dated Nov. 23, 2018, 21 pages.

(Continued)

*Primary Examiner* — Wen Huang
(74) *Attorney, Agent, or Firm* — Kilpatrick Townsend & Stockton LLP

(57) ABSTRACT

A structured film for use with a display comprises an optically transmissive surface including a plurality of walls. When the film is placed in an operative position with respect to the display, the walls extend away from the display at different heights and surround light emitters of the display. The film operates as a diffraction grating and the walls are configured to generate selected diffraction orders for each light emitter, including generating a diffraction order for a first light emitter and a diffraction order for a second light emitter adjacent to the first light emitter such that a predefined portion of light energy radiated by the first light emitter is permitted to spread toward the second light emitter. The film minimizes the screen-door effect and can be used in combination with local contrast control over a region of interest.

20 Claims, 11 Drawing Sheets

(56) References Cited

U.S. PATENT DOCUMENTS

| | | |
|---|---|---|
| 2012/0262616 A1 | 10/2012 | Sa et al. |
| 2013/0056809 A1 | 3/2013 | Mao et al. |
| 2013/0141619 A1 | 6/2013 | Lim et al. |
| 2013/0207219 A1 | 8/2013 | Ahn |
| 2014/0042299 A1 | 2/2014 | Wan et al. |
| 2015/0189209 A1 | 7/2015 | Yang et al. |
| 2015/0279884 A1 | 10/2015 | Kusumoto |
| 2015/0312502 A1 | 10/2015 | Borremans |
| 2016/0028974 A1 | 1/2016 | Guidash et al. |
| 2016/0088253 A1 | 3/2016 | Tezuka |
| 2016/0100115 A1 | 4/2016 | Kusano |
| 2016/0165160 A1 | 6/2016 | Hseih et al. |
| 2017/0111600 A1 | 4/2017 | Wang et al. |
| 2017/0346579 A1 | 11/2017 | Barghi |

OTHER PUBLICATIONS

International Application No. PCT/US2018/039352, "International Search Report and Written Opinion Received", dated Oct. 26, 2018, 10 pages.
International Application No. PCT/US2018/039431, "International Search Report and Written Opinion", dated Nov. 7, 2018, 14 pages.
European Application No. EP18179838.0, "Partial European Search Report", dated Dec. 5, 2018, 14 pages.
European Application No. EP18179851.3, "Extended European Search Report", dated Dec. 7, 2018, 8 pages.
U.S. Appl. No. 15/847,517, "Notice of Allowance", dated May 1, 2019, 11 pages.
International Application No. PCT/US2019/014044, "International Search Report and Written Opinion", dated May 8, 2019, 11 pages.

\* cited by examiner

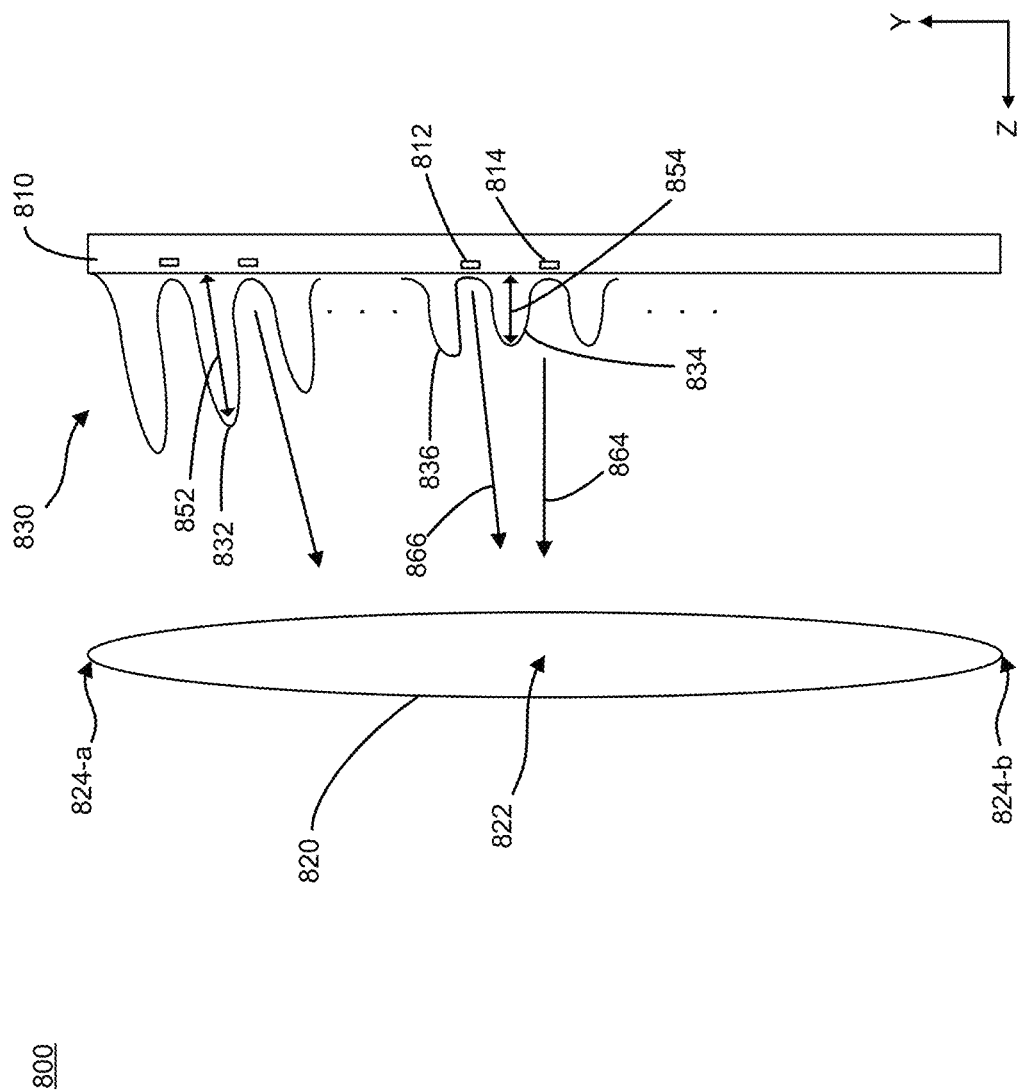

DYNAMICALLY STRUCTURED PROTECTIVE FILM FOR MAXIMUM DISPLAY RESOLUTION

BACKGROUND OF THE INVENTION

Liquid crystal displays (LCDs), organic light-emitting diode (OLED) displays, and other types of digital displays are used in augmented reality (AR) and virtual reality (VR) systems. In a typical AR or VR system, the viewer does not directly view the display, but instead there are one more optical elements that guide light from the display toward the eye of the viewer. The optical elements and the display are sometimes housed together, for example, as a near-eye display (NED) unit. The quality of the viewing experience depends on a number of factors including the optical characteristics of the lenses and the display resolution.

One problem that affects digital displays is the screen-door effect (SDE), which refers to a visual artifact that occurs when the gaps between adjacent pixels become visible to the viewer. The gaps appear as gridlines around the pixels. SDE can be mitigated by using a display with a higher resolution, i.e., more pixels. However, this is not always possible. Additionally, SDE is of particular concern in AR and VR systems because the display is generally viewed under magnification, closer to the eye of the viewer compared to other display environments, and at a higher field of view than is optimal for the display. Even full HD (high definition) displays, which have a resolution of 1920× 1080 pixels, can be susceptible to SDE when used in an AR or VR application.

BRIEF DESCRIPTION OF THE DRAWINGS

Illustrative embodiments are described with reference to the following figures.

FIG. 8 shows a cross-sectional view of a display system, in accordance with an embodiment.

Figure 1:
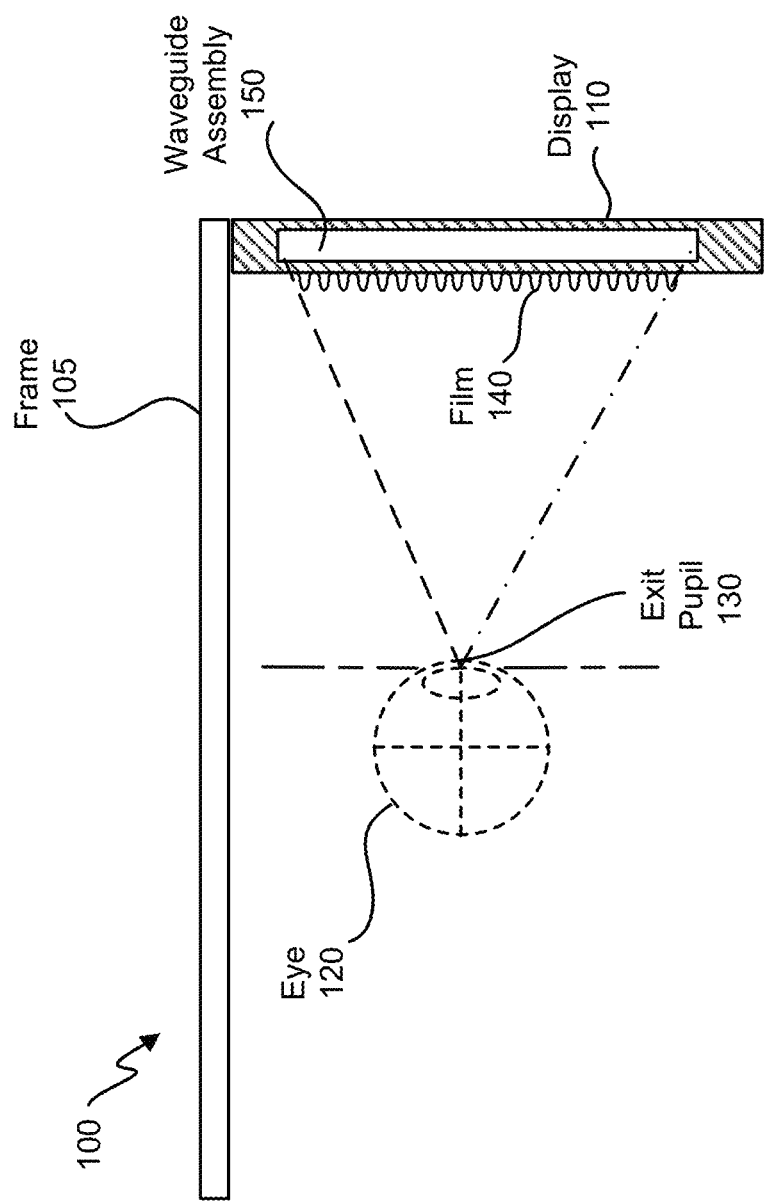
FIG. 1 shows a cross-sectional view of a near-eye display, in accordance with an embodiment.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Unless expressly stated otherwise, the components and features shown in the figures are not drawn to scale. In some instances, components and/or features may have been drawn out-of-scale in order to better illustrate certain aspects of those components or features.

DETAILED DESCRIPTION OF THE INVENTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Example embodiments of the present disclosure relate to a three-dimensional (3D) structured film that can be placed over a display to form a protective layer, and a system including the display and the structured film. The film is configured to minimize SDE by controlling the light output of individual light emitters that form pixels of the display. In one embodiment, the film comprises curved walls that extend away from the display, with a wall at each corner of any particular emitter so that the emitter lies at the bottom of a "valley" formed by four walls. The film can be formed such that the heights of the walls are set to minimize SDE by permitting a certain amount of light to spread toward adjacent emitters, thereby hiding the gridlines. The heights for minimizing SDE can be determined based on the sizes and colors of the emitters. Other characteristics of the walls, including the angles at which the walls extend away from the display, can also contribute to minimizing SDE.

Additionally, the heights can vary between different walls, i.e., the height may not be uniform throughout the film, thereby giving the film a dynamic structure. The heights can be different to compensate for variations in image quality produced by an optics system through which light from the display is transmitted to an eye of a user. For example, the optics system may include a spherical lens configured to provide a sharper image at the center of the lens, with the image becoming blurrier toward the radial edges of the lens. To compensate for the variation in image quality, the walls can be set higher toward the radial edges in order to increase the sharpness of the image near the radial edges.

The film can be used in combination with local contrast control to increase sharpness depending on the content being displayed. In one embodiment, the system includes a contrast control module for analyzing image content to identify a region of interest (ROI) and to increase the sharpness of the ROI by adjusting the dynamic range and/or the brightness of pixels in the display. For example, the ROI may include a fine detail comprising a set of darker pixels surrounded by brighter pixels (e.g., black text against a white background). With appropriate contrast control, the brightness of the fine detail pixels relative to the brightness of the surrounding pixels can be set so that the fine detail pixels are not overwhelmed by the surrounding pixels.

Embodiments of the invention may include or be implemented in conjunction with an artificial reality system. Artificial reality is a form of reality that has been adjusted in some manner before presentation to a user, which may include, e.g., a VR, an AR, a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an NED connected to a host computer system, a standalone NED, a mobile device or computing system, or any other hardware platform capable of providing artificial reality content to one or more viewers.

FIG. 1 shows a cross section of an NED 100. The NED 100 includes a frame 105 and a display 110. The frame 105 is coupled to one or more optical elements. The frame 105 can be adapted to be worn by the user, for example supported against the user's ears and temples in the manner of a pair of eyeglasses. Thus, the NED 100 can be a head mounted display (HMD). Other mechanisms exist for attaching an HMD to a user's head. For example, in some embodiments, the NED 100 may include an adjustable band for securing the NED 100 around the back of the head.

The display 110 is configured for the user to see content presented by the NED 100 and includes a waveguide assembly 150 for directing light from one or more images to an eye 120 of the user. When placed into an operative position, the NED 100 forms an exit pupil 130 at a location where the eye 120 is positioned in an eyebox region, e.g., when the user wears the NED 100. For purposes of illustration, FIG. 1 shows the cross section associated with a single eye 120 and a single waveguide assembly 150, but a second waveguide assembly can be used for a second eye of the user.

A structured film 140 is attached to the front surface of the display 110, in an operative position with respect to the display 110. The film 140 includes a plurality of curved walls, shown in more detail in the subsequent figures. The film 140 comprises an optically transmissive surface that controls the light output from the display 110. The walls extend away from the display, toward the eye 120 of the user. Although the walls are shown in FIG. 1 as being of uniform height, in actuality the walls can have different heights, with some walls extending farther out than others. The walls surround light emitters of the display (shown in FIG. 3) and the film operates as a diffraction grating that generates diffraction orders for the light emitters.

The waveguide assembly 150 is configured to direct the image light to the eye 120 through the exit pupil 130. The waveguide assembly 150 may be composed of one or more materials (e.g., plastic, glass, etc.) with one or more refractive indices. In some embodiments, the NED 100 includes one or more optical elements between the waveguide assembly 150 and the eye 120. The waveguide assembly 150 may be composed of one or more materials with one or more refractive indices that effectively minimize the weight and widen a field of view (FOV) of the NED 100.

The NED 100 can include one or more optical elements (not shown) between the waveguide assembly 150 and the eye 120. The optical elements form an optics system that acts to, e.g., correct aberrations in image light emitted from the waveguide assembly 150, magnify image light emitted from the waveguide assembly 150, perform some other optical adjustment of image light emitted from the waveguide assembly 150, or some combination thereof. As such, the optical elements may include an aperture, a Fresnel lens, a convex lens, a concave lens, a filter, a reflector, or any other suitable optical element that affects image light.

Figure 2:
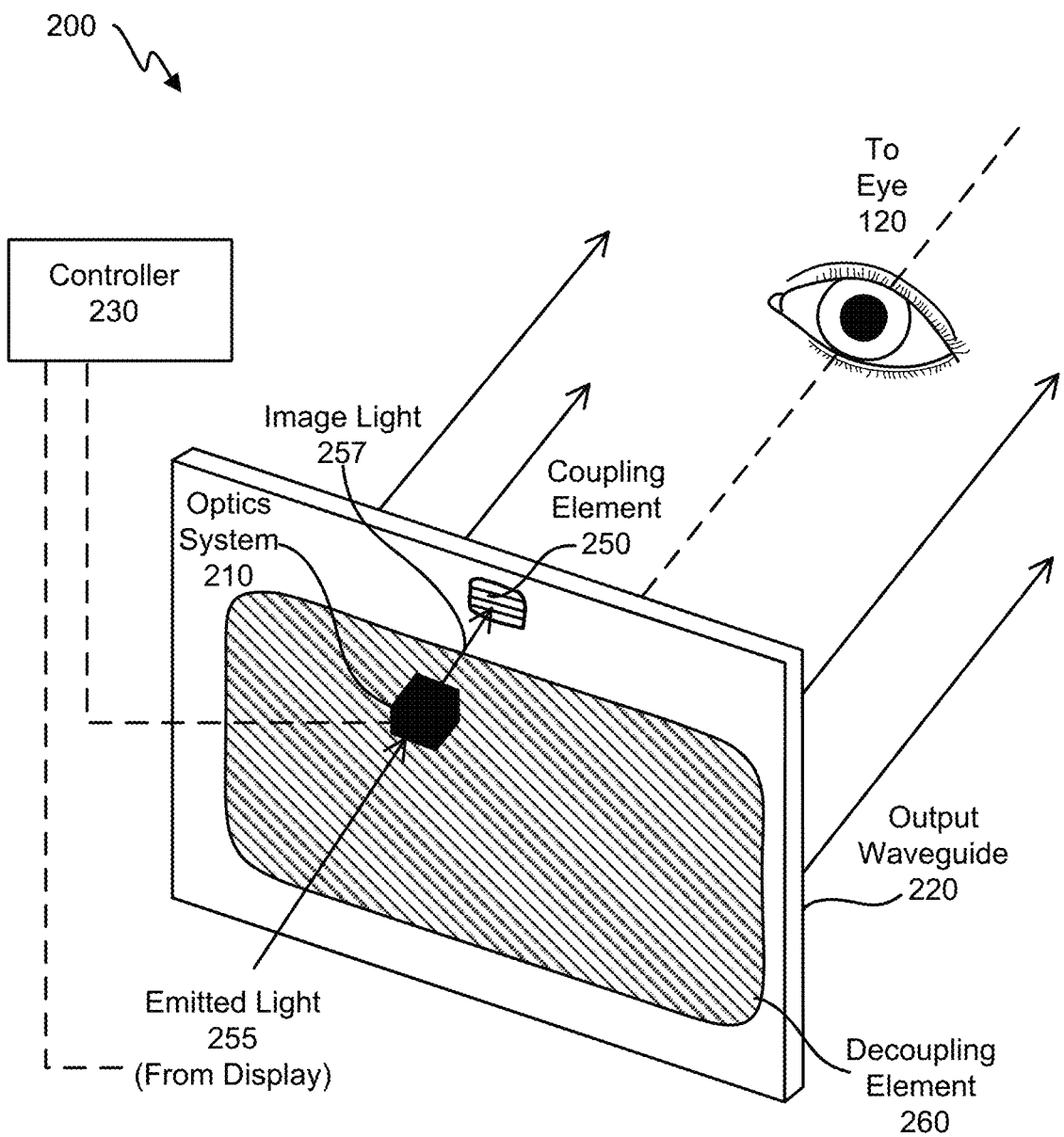
FIG. 2 shows an isometric view of a waveguide assembly, in accordance with an embodiment.

FIG. 2 shows an isometric view of a waveguide assembly 200. In some embodiments, the waveguide assembly 200 is a component of a display in an NED (e.g., the NED 100). In other embodiments, the waveguide assembly 200 is a separate component located along an optical path between the display and the eye 120 of the user. The waveguide assembly 200 includes an optics system 210, an output waveguide 220, and a controller 230.

The waveguide assembly 200 receives emitted light 255 from a display (not shown) and processes the emitted light 255 through the optics system 210 to generate image light 257. The emitted light 255 is generated by light emitters of the display. A light emitter can be an a light emitting diode (LED), a micro light emitting diode (mLED), a vertical-cavity surface-emitting laser (VCSEL), a photonics integrated circuit (PIC), etc. The light emitters can be organized in a one-dimensional (1D) or two-dimensional (2D) array. The emitters can be grouped to form pixels of the display. For example, an individual pixel may include at least one red emitter, at least one green emitter, and at least one blue emitter.

The optics system 210 comprises one or more optical elements (e.g., one or more lenses) that perform a set of optical processes, including, but not restricted to, focusing, combining, collimating, transforming, conditioning, and scanning processes on the image light generated by the display.

The output waveguide 220 is an optical waveguide that outputs images to the eye 120 of the user. The output waveguide 220 receives the image light 257 (possibly after processing through the one or more optical elements of the optics system) at one or more coupling elements 250, and guides the image light 257 to a decoupling element 260. The coupling element 250 may include, e.g., a diffraction grating, a holographic grating, some other element that couples the image light 257 into the output waveguide 220, or some combination thereof. For example, in embodiments where the coupling element 250 includes a diffraction grating, the pitch of the diffraction grating can be chosen such that total internal reflection occurs and the image light 257 propagates internally toward the decoupling element 260.

The controller 230 drives the light emitters of the display to generate the emitted light 255. The controller 230 also controls the optics system 210 to perform the one or more optical processes. For example, the controller 230 may reposition one or more lenses of the optics system 210 to adjust a focus of the image light 257.

Figure 3:
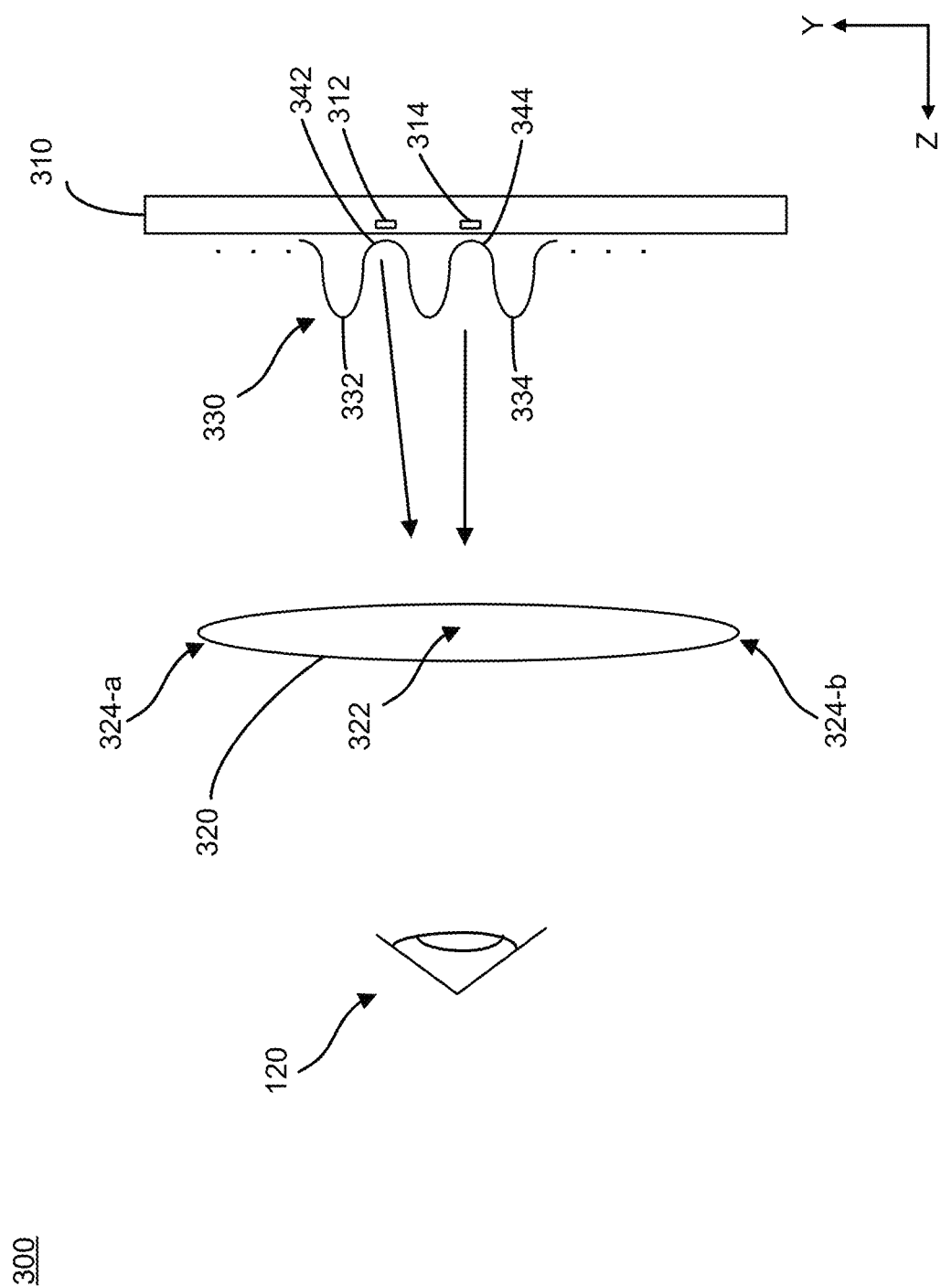
FIG. 3 shows a cross-sectional view of a display system, in accordance with an embodiment.

FIG. 3 shows a cross section 300 of various components in a display system, including a display 310 and a lens 320. The display 310 can be a component of an NED (e.g., the display 110). In some embodiments, the display 310 is a component of a non-wearable computer device. For example the display 310 can be for a computer display monitor, a laptop, a smartphone, a digital camera, or a television set. The display 310 includes a plurality of light emitters, including emitters 312 and 314. The emitters can be arranged into one or more rows and one or more columns. For example, emitters 312 and 314 may belong to the same column, but different rows.

As shown in FIG. 3, a structured film 330 is mounted on the display 310, between the display 310 and the lens 320. The proportions of the structured film 330 are exaggerated to show the structure more clearly. The structured film 330 can be formed integrally with the display 310 or formed separately and then attached to the display 310, e.g., using an adhesive or through bonding. The structured film 330 operates as a protective layer for the display 310, in particular providing protection against contact or intrusion of foreign particles, which could damage the emitters 312, 314 or electronics within the display 310. Additional protection for the display 310 can be provided by adding an encapsulating layer (not shown) over the structured film 330.

The lens 320 is part of an optics system that transmits light from the display 310 to the eye 120 of the user. The optics system is located between the display 310 and the eye 120 and, in some embodiments, corresponds to the optics system 210 in FIG. 2. For simplicity, only one lens is shown. However, as discussed earlier, an optics system can include multiple lenses, among other optical elements. The lens 320 is a spherical convex lens with a thickness that is greatest at the center 322 of the lens. The thickness gradually decreases toward radial edges 324-a and 324-b. Other lens shapes are also possible, and a more complex optics system can include multiple lenses of different sizes and shapes, e.g., a combination of concave and convex lenses. Additionally, although FIG. 3 shows the display 310 being viewed directly through the lens 320, it is understood that in some embodiments, an image produced by the display 310 could be viewed indirectly, e.g., using coupling and decoupling elements as described earlier in connection with FIG. 2.

The structured film 330 is formed of an optically transmissive material such as polycarbonate or acrylic. In some embodiments, the structured film 330 is rigid. In other embodiments, the structured film 330 is flexible, e.g., formed of a flexible polymer. The film 330 comprises a plurality of walls, including a wall 332 near the emitter 312 and a wall 334 near the emitter 314. The walls 332, 334 are curved and substantially mound-shaped, e.g., with a Gaussian shaped cross section. The walls project away from the display 310 to direct light from the emitters toward the lens 320. Each wall has a peak, with the emitters being situated at the bottom of valleys defined by the walls, e.g., valleys 342 and 344. Emitted light travels through the valleys at different angles of incidence toward the lens 320. For example, emitters that are positioned at or near the center of the lens 320, such as the emitter 314, may emit light at an angle of incidence that is substantially orthogonal to the plane of the lens 320. Emitters that are farther away from the center of the lens (i.e., closer to one of the radial edges 324-a or 324-b) may emit light at an angle of incidence that is non-orthogonal to the plane of the lens 320.

Figure 4:
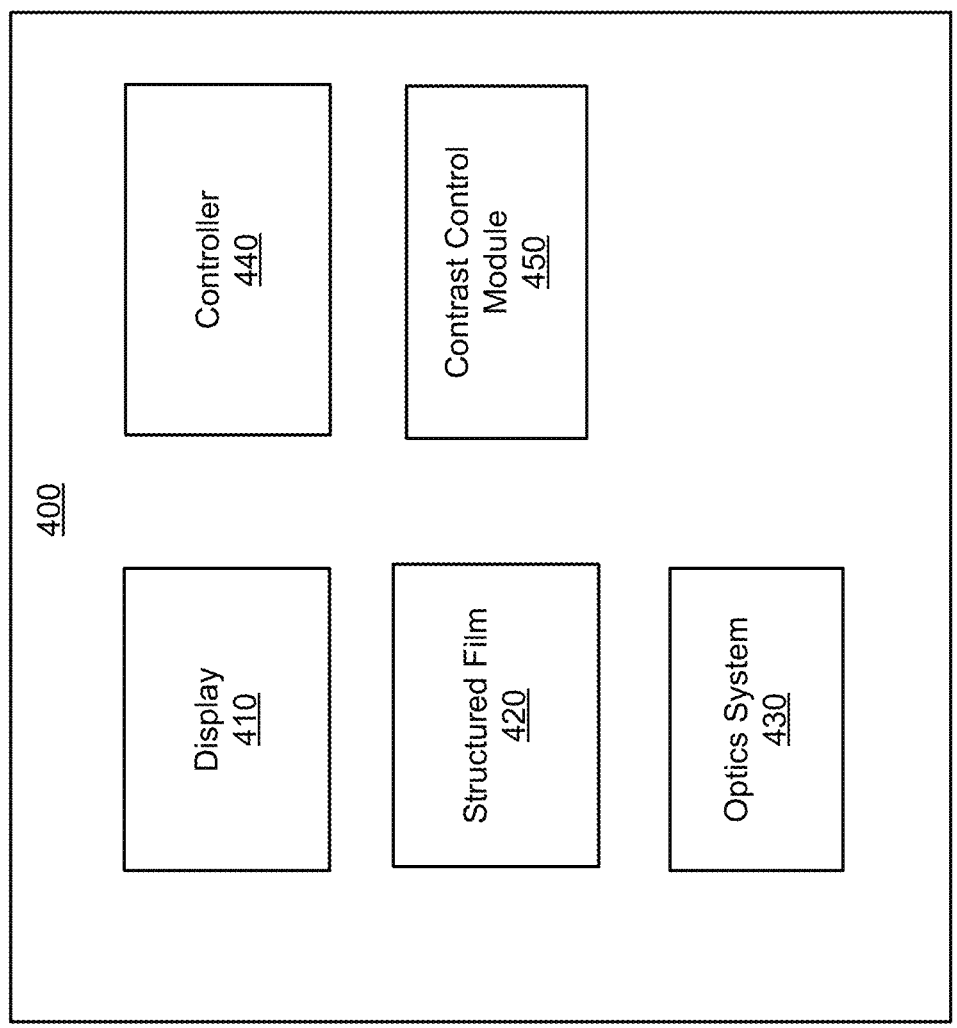
FIG. 4 is a block diagram of a system, in accordance with an embodiment.

FIG. 4 is a block diagram of a system 400 including a display 410, a structured film 420, an optics system 430, a controller 440, and a contrast control module 450.

The display 410 is analogous to the display 310 and can be a component of an NED or an ordinary display, such as for a laptop or mobile device. The display 410 can be a flat panel display or non-flat, i.e., a curved display. The structured film 420 is attached to the display 410, e.g., when the display is manufactured.

The optics system 430 can include one or more lenses such as the lens 320. As explained later, the image quality of the image output by an optics system can vary as a function of spatial position. The variation in image quality may be a result of passing emitted light through the one or more lenses of the optics system 430. The structured film 420 is configured to compensate for the variation in image quality through appropriate configuration of the walls. In particular, the structured film 420 can be manufactured with a varying height profile in order to selectively control the spread of emitted light, such that the image quality is enhanced at locations where the image quality would normally be worse due to processing by the optics system 430.

The controller 440 can include one or more processors configured to execute instructions that cause image content to be displayed on the display. In particular, the controller 440 can operate as a display driver that selectively activates the emitters of the display 410 to form an image. In this capacity, the controller 440 may output digital control values to the display. The digital control values determine control parameters such as color and intensity of individual emitters, which in turn determine the color and intensity of the pixels formed by the emitters. For example, the controller 440 may specify control values for a red emitter, a blue emitter, and a green emitter so that the three emitters together generate a color corresponding to a chrominance value for a pixel formed by the three emitters, with a combined brightness equal to a luminance value for the pixel. The controller 440 can also perform local contrast control, e.g., based on instructions provided by the contrast control module 450. Additionally, the controller 440 can be configured to perform the functions described earlier with respect to the controller 230, e.g., controlling the optics system 430 to perform one or more optical processes.

The contrast control module 450 implements a contrast control procedure that sets the contrast levels of the pixels of the display 410 according to the contents of the image to be displayed. The contrast control module 450 can be a hardware module, a software module, or a combination of hardware and software. Contrast control can involve locally adjusting the brightness of an ROI in an image to be displayed. For example, the image may include a relatively bright region surrounding a smaller region that is relatively dark in comparison to the bright region. Sometimes, this darker region corresponds to a fine detail, e.g., dark sub-title text against a bright background from a movie scene. If the brightness of the bright region is set too high, the fine detail may be difficult to see clearly. In this situation, it may be desirable to adjust the brightness of the dark region in relation to the bright region. This can be accomplished, for example, by lowering the dynamic range of all the pixels in the display (e.g., limiting the display to certain brightness ranges) or lowering the dynamic range of the pixels in the bright region so that the bright region does not overwhelm the dark region. The dynamic range of the pixels in the dark region can also be increased to enhance the level of detail for the dark region. Contrast control can also be accomplished by adjusting brightness values, e.g., by lowering the brightness values of pixels surrounding the dark region. The contrast control procedure can therefore include an analysis of each image to be displayed, in order to identify ROIs (in the example above, the dark region) and to perform an appropriate contrast adjustment. The emitters of a pixel being contrast adjusted can be individually controlled in order to achieve a desired brightness for the pixel.

Figure 5:
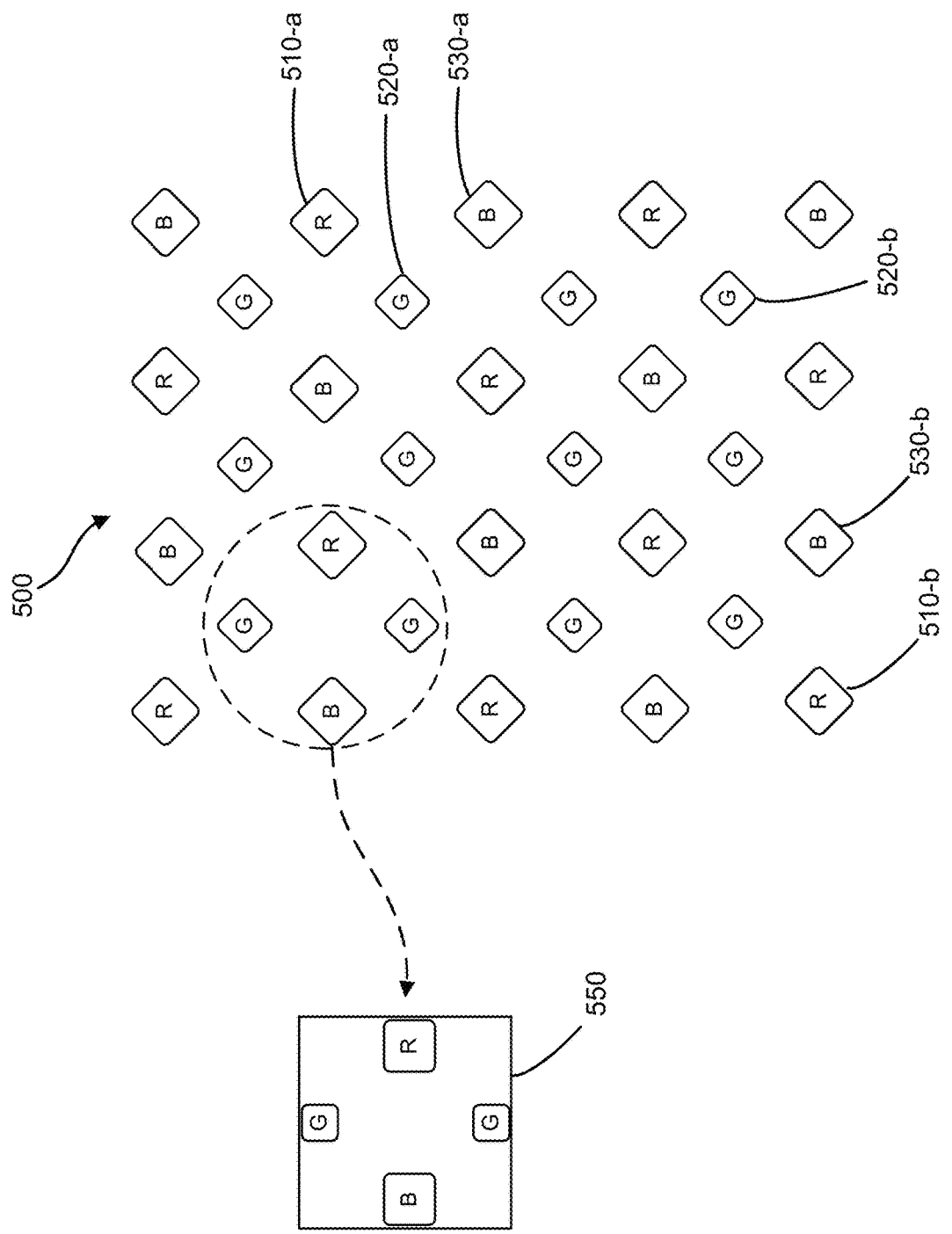
FIG. 5 shows an emitter layout for a display, in accordance with an embodiment.

FIG. 5 shows a partial emitter layout for an embodiment of a display 500. The display 500 includes a plurality of emitters, such as a red emitters 510-a and 510-b, green emitters 520-a and 520-b, and blue emitters 530-a and 530-b. As shown in FIG. 5, a pixel 550 may comprise a group of red, green and blue emitters. In this example, the pixel 550 includes one red emitter, two green emitters, and one blue emitter. The emitters may be of different sizes and shapes. In FIG. 5, the green emitters are smaller than the red and blue emitters, and the emitters have a rounded diamond shape. In other embodiments, the emitters can be of other sizes and may have other shapes such as circular, oval, square, etc.

FIG. 5 shows the emitters being spaced apart from one another. In one embodiment, emitters are spaced equally far apart regardless of color, e.g., a spacing of 30 micrometers between any given pair of emitters. In another embodiment, the spacing between different color emitters can be different, e.g., red emitters can be closer to green emitters than to blue emitters. As a consequence of the emitter spacing, the pixels of the display 500 are also slightly spaced apart. In most instances, pixel spacing in a display is not visible to the human eye when the display is lit because the pixels are bright enough that the gaps between pixels are hidden. However, there are situations where the gaps become visible, giving rise to the appearance of a grid-like pattern of fine lines around the pixels. This is commonly referred to as the screen-door effect (SDE). SDE can appear when a display is viewed up close, under magnification, or at a higher field of view than is optimal for the display. This makes eliminating SDE a challenge in AR and VR applications. To overcome SDE, the contrast control module 450 can be configured to set a minimum brightness for each pixel of the display so that SDE is reduced or eliminated entirely so as not to be visible to the human eye under intended viewing conditions for the display. For example, the contrast control module 450 can set a higher minimum brightness when the pixels are farther apart or when the display is incorporated into an NED. Thus, contrast control is one technique that can be used to overcome SDE. As explained below, SDE can also be overcome using a structured film in accordance with an example embodiment, either alone or in combination with contrast control.

Figure 6:
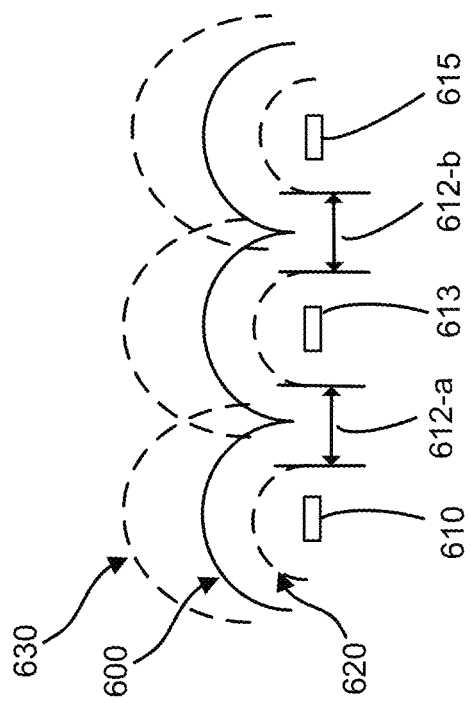
FIG. 6 shows various energy radiation profiles for a set of emitters.

FIG. 6 shows energy radiation profiles corresponding to the light energy radiated by neighboring emitters 610, 613, and 615. FIG. 6 includes an ideal radiation profile 600 in which the light radiated by any individual emitter is confined to within a certain distance of the emitter, such that there is minimal interference between the radiated light and light radiated by an adjacent emitter. Further, the radiation profile 600 provides for complete coverage of the gaps 612-a and 612-b between the emitters so that SDE is eliminated. If the brightnesses of the emitters 610, 613, 615 are lowered, the radiated light may become similar to radiation profile 620, where the gaps are no longer completely covered, making SDE apparent. On the other hand, if the brightnesses are increased, then radiated light may become similar to radiation profile 630, where light from one emitter interferes with light from an adjacent emitter. For example, light from emitter 610 would spread into the light from emitter 613 and vice versa, producing a "bleaching" effect in which the interference between adjacent emitters leads to a loss of color fidelity and sharpness. This bleaching effect reduces the effective resolution of the display relative to the native resolution.

Figure 7:
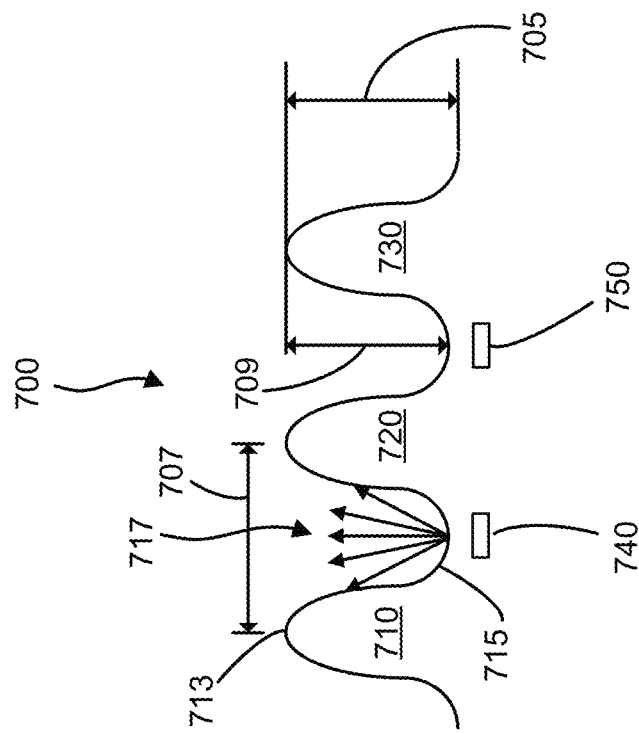
FIG. 7 shows a cross-sectional view of a structured film, in accordance with an embodiment.

FIG. 7 shows a cross-section of a structured film 700 according to an embodiment. The film 700 includes a plurality of walls 710, 720, and 730 that are curved to define a series of peaks and valleys over emitters 740 and 750. For example, the wall 710 includes a peak 713 and, together with the wall 720, forms a valley 715 above the emitter 740. The walls 710, 720, and 730 are separated by a certain pitch 707, which can vary throughout the film 700. As shown in FIG. 7, light 717 from the emitter 740 is emitted in multiple directions. Some of the light 717 is able to pass the film 700 unimpeded. The light that passes can form a perceived image that is larger than the actual size of the emitter, i.e., the emitters 740 and 750 may appear magnified when viewed through the film 700. Other parts of the light 717 are blocked by the walls 710, 720. The degree to which the light 717 is blocked is determined, in part by the height 705 of the walls 710, 720. Therefore the heights of the walls can be set so that SDE is minimized by allowing enough light to pass that the gaps between adjacent emitters are hidden, while blocking light that would otherwise contribute to the bleaching effect. The walls 710, 720, and 730 have a certain depth 709, corresponding to a vertical distance between a peak and a valley. The depth 707 can be shorter than the overall height 705 of walls. As discussed below in connection with FIGS. 9 and 10A to 10C, the heights can be determined for each emitter based on knowledge that the film operates as a diffraction grating.

FIG. 8 shows a cross section of a display system 800 including a display 810 and a lens 820. A structured film 830 is attached to the front of the display 810, between the display 810 and the lens 820. In FIG. 7, the walls are shown as being identical, with each wall 710, 720, 730 having the same orientation and the same height. In the embodiment of FIG. 8, the walls have different heights and different angles of orientation. Thus, the film 830 has a dynamic structure that varies depending on location along the film. This dynamic structure takes into account variations in image quality as result of processing through the lens 820.

Similar to the lens 320 in FIG. 3, the lens 820 is a spherical convex lens. This particular shape of the lens 820 produces a sharper image for light passing through the center 822 of the lens. In comparison, light that passes through the edges 824-a and 824-b of the lens produces a blurrier image. Image sharpness is therefore greatest at the center 822 and decreases toward the edges 824-a, 824-b. To compensate for this variation in image quality, the wall heights of the film 830 are varied in accordance with variations in image quality, as a function of the position of the display 810 with respect to the lens 820. Walls that are farther away from the center 822 (e.g., walls 832 and 836) can be formed with a higher height and walls that are closer to the center 822 (e.g., wall 834) can be formed with a lower height. For example, the height 852 of wall 832 is greater than the height 854 of wall 834. Varying wall height effectively changes the distance between the display 810 and the lens 820 at different areas of the display. Lower wall heights allow more spreading of light toward adjacent emitters, resulting in a blurrier image. Higher wall heights reduce spreading and therefore increase sharpness. By structuring the film such that lower walls are applied to sharper image areas and higher walls applied to blurrier image areas, a relatively uniform image quality can be achieved throughout the display.

In some embodiments, the heights of the walls are computed based on an image quality profile of the optics system. The image quality profile can include one or more image quality metrics (sharpness, lens distortion, chromatic aberration, etc.) as a function of position in one dimension (e.g., Y position along a length of the display) or two dimensions (e.g., X, Y position along a length and a width of the display). For example, in an optics system with only the lens 820, an image quality profile based on sharpness along a length of the display (the Y-axis in FIG. 8) may correspond to a monotonic function, e.g. a paraboloid, derived from the field curvature of the lens 820. In that case, the wall heights would also vary monotonically in inverse relationship to the image quality profile. In a more complex optics system with multiple optical elements, the optical elements may interact to produce an image quality profile that is non-monotonic, and the wall heights can be set accordingly.

As shown in FIG. 8, the angles of the walls also vary along the film. In particular, the wall angles vary in correspondence to the different angles of incidence for the light emitted from the display 810 toward the lens 820. Light from the emitter 814 has an angle of incidence 864 that is substantially perpendicular to the plane of the lens 820, whereas light from emitter 812 is at a different angle of incidence 866. The angles of the walls can be varied so as to facilitate the propagation of light along the various angles of incidence. The wall angles can be produced by changing the shapes of the walls. For example, wall 834 next to emitter 814 has a symmetric, Gaussian shape, whereas wall 836 next to emitter 812 has an asymmetric shape. When the wall is symmetric, the energy radiation is also symmetric, i.e., uniform in all directions. With a non-symmetric wall, the energy radiation is non-uniform.

As mentioned earlier, the film operates as a diffraction grating. In particular, the openings of the diffraction grating correspond to the valleys where the emitters are located. When light passes through these openings, diffraction orders are created. The lowest diffraction order is centered about the light source and has the greatest intensity. Additional diffraction orders are positioned farther away from the light source and have lesser intensity. This is shown in FIG. 9.

Figure 9:
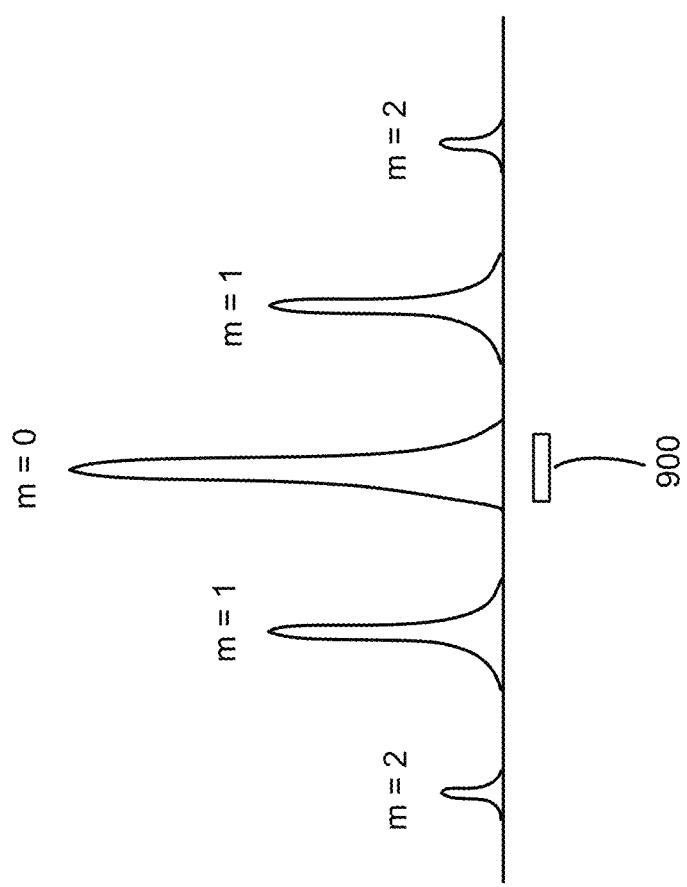
FIG. 9 shows intensity for different diffraction orders.

FIG. 9 is a diagram of intensity for different diffraction orders of an emitter 900. Three diffraction orders are shown (m=0, 1, and 2). However, any number of diffraction orders can be generated. The intensity of the zero order (m=0) is greatest and forms a bright spot centered about the emitter 900. This corresponds to light that is emitted along the angle of incidence for the emitter 900. The first order (m=1) has a lower intensity compared to the zero order and includes a pair of bright spots that are slightly offset to the sides of the emitter 900. Similarly, the second order (m=2) has an even lower intensity than the first order and has bright spots that are farther to the sides of the emitter 900. Integrating the diffraction orders yields an energy radiation profile for the emitter 900, e.g., one of the profiles shown in FIG. 6.

The shapes of the walls in a structured film can be set with various objectives in mind. One objective is, as mentioned earlier, the elimination of SDE. The degree to which SDE is eliminated depends on the interaction between the various diffraction orders that are produced. The presence or absence of certain diffraction orders for any given emitter can be controlled with appropriate configuration of the walls surrounding the emitter. Since the spread of light is increased with each successive increase in diffraction order, the diffraction order can be chosen for any particular emitter such that the light from the emitter spreads by a selected amount in order to hide the gaps between the emitter and its adjacent emitters.

Figure 10C:
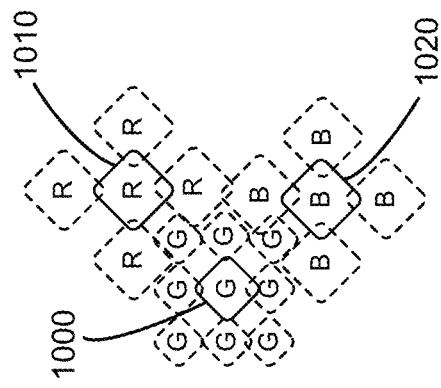
FIGS. 10A to 10C show an example of how diffraction orders can be used to reduce or eliminate the screen-door effect, in accordance with an embodiment.
Figure 10B:
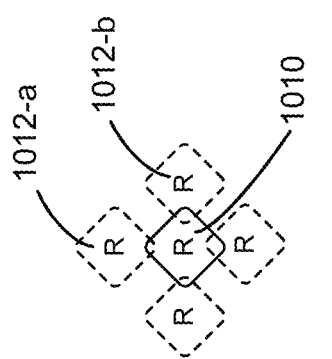
Figure 10A:
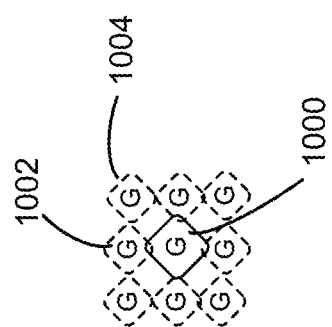

FIGS. 10A to 10C show an example of how diffraction orders can be used to reduce or eliminate SDE. In FIG. 10A, second order diffraction has been created for a green emitter 1000, resulting in a diffraction pattern in which a plurality of virtual sub-pixels are clustered around the emitter 1000. The diffraction pattern has a bright spot centered about the emitter 1000, corresponding to the zero order. The virtual sub-pixels are less bright and include, for example, a virtual sub-pixel 1002 belonging to the first order and a virtual sub-pixel 1004 belonging to the second order. The virtual sub-pixels form additional green areas that increase the apparent size of the emitter 1000.

FIG. 10B shows a first order diffraction pattern for a red emitter 1010. The diffraction pattern includes virtual sub-pixels 1012-a and 1012-b. FIG. 10C shows an interaction between diffraction patterns of adjacent emitters, including the green emitter 1000 from FIG. 10A, the red emitter 1010 from FIG. 10B, and a blue emitter 1020 having a first order diffraction pattern. As shown, the virtual sub-pixels from the various diffraction patterns operate to cover the gaps between the emitters 1000, 1010, and 1020. Therefore the diffraction orders can be selected for each emitter in a display such that SDE is minimized. In FIG. 10C, a higher order was selected for the green emitter 1000 (i.e., the second order) than for the red emitter 1010 and the blue emitter 1020 because the emitter 1000 is smaller than the emitters 1010, 1020. Thus, the desired diffraction order can be based on the size of the emitter. However, the desired diffraction order can also vary depending on other factors, such as the spacing between emitters and the relative brightnesses of different color emitters. In some embodiments, the diffraction orders are selected so that the virtual sub-pixels are spaced close together with a small degree of overlap. For example, an edge of a green virtual sub-pixel may overlap an opposing edge of a blue virtual sub-pixel. In some embodiments, a certain degree of interference between diffraction orders of adjacent emitters is permitted so long as the diffraction orders do not overwhelm each other. For example, a green virtual sub-pixel can be permitted to overlap with a blue virtual sub-pixel in an area that is supposed to correspond to the blue virtual sub-pixel so long as the green virtual sub-pixel is less bright compared to the blue virtual sub-pixel. In other embodiments, the diffraction orders can be selected so that there is no overlap between virtual sub-pixels so long as the gaps between the emitters are sufficiently covered. For the purpose of minimizing SDE, the gaps do not have to be completely covered.

Once a desired diffraction order has been determined for each emitter, the characteristics of the walls surrounding the emitter can be determined using known diffraction grating equations, including the following equation for refraction in a diffraction grating placed over an incident medium: $d\,(n'\sin v - n \sin i) = m\lambda$, where m is the desired diffraction order, $\lambda$ is the wavelength of the incident light (e.g., the light produced by an emitter), d is the spacing of the diffraction grating (e.g., the spacing between the walls of the structured film), n is the index of refraction of the incident medium (e.g., the display layer in which the emitters are located), n' is the index of refraction of the diffraction medium (e.g., the film), i is the angle of incidence, and v is the angle of refraction toward the lens. The above equation can be used, for example, to solve for the angle of refraction v at a given diffraction order.

Knowing the various angles of refraction at each diffraction order generated for an emitter, it is possible to design the walls so that refracted light rays of a desired diffraction order are passed, but refracted light rays of other diffraction orders are blocked. For example, the wall heights for green emitters can be set so that third or higher orders are blocked. Similarly, the wall heights for red and blue emitters can be set to block second or higher orders. In one embodiment, wall heights and wall angles are calculated based on an analysis of the energy radiation profiles for each emitter. As mentioned earlier in the discussion of FIG. 6, the energy radiation profile corresponds to an integral of the diffraction orders. Thus, the energy radiation profile encompasses all possible angles at which light can pass through the film.

Accordingly, the wall heights and wall angles can be calculated to block certain portions of the energy radiation profile, thereby limiting the spread of light toward adjacent emitters to prevent bleaching.

Additionally, the wall heights and wall angles can be designed to maximize diffraction efficiency at a particular diffraction order, based on the fact that the film operates similarly to a Fresnel surface. The film can be characterized by the Fresnel equation: $h=d(\alpha-\beta)$, where h is the height of the wall, d is in this instance the length of one side of the wall (corresponding to a facet of a Fresnel surface), $\alpha$ is the base curvature of the film, and $\beta$ is the angle of the wall (i.e., the facet angle). It has been experimentally determined that diffraction efficiency is maximized when the wall height is a multiple of the desired wavelength, in particular the least common multiple between wavelengths, and when the wall angle $\beta$ satisfies the Fresnel equation above. For example, the diffraction efficiency for a green emitter is maximized when the wall height of a wall next to the green emitter is a multiple of a wavelength of the green emitter and the wall angle $\beta$ satisfies the Fresnel equation above. Further, the diffraction efficiency can be optimized for two different colors (e.g., for a wall separating a red emitter from a green emitter) by setting the wall height to the least common multiple between the wavelengths of the two colors. In some embodiments, diffraction efficiency is maximized for only some of the emitters. For example, diffraction efficiency can be maximized for smaller emitters (e.g., green emitters) while permitting a less than optimal diffraction efficiency for larger emitters (e.g., red and blue emitters).

Figure 11:
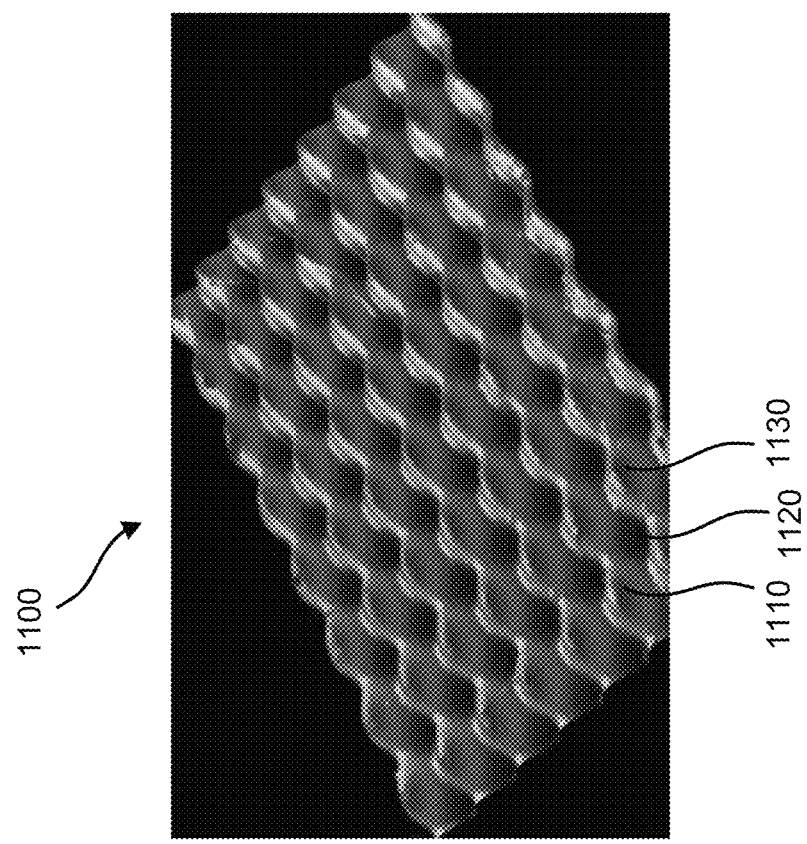
FIG. 11 shows a three-dimensional view of a structured film, in accordance with an embodiment.

FIG. 11 shows a three-dimensional view of a structured film 1100. The film 1100 has a plurality of walls, including a wall 1110 and a wall 1130. Emitters are located below the valleys defined by the walls, e.g., a valley 1120. Each emitter is surrounded by four walls, one at each of four corners. However, the number of walls surrounding an emitter can vary.

In addition to minimizing SDE and reducing bleaching of pixels, a structured film can provide other benefits depending on the display environment in which the film is used. For example, if the film is incorporated into an NED, the film can prevent sunlight from burning the display when the NED is left exposed to the sun. Without the film, sunlight passing through the lens or lenses of the optics system in the NED is focused onto certain portions of the display (e.g., the center of the display) and can damage the display over time. The wall structure of the film can prevent this damage by scattering the sunlight so that it is not concentrated in any particular area of the display.

Figure 12:
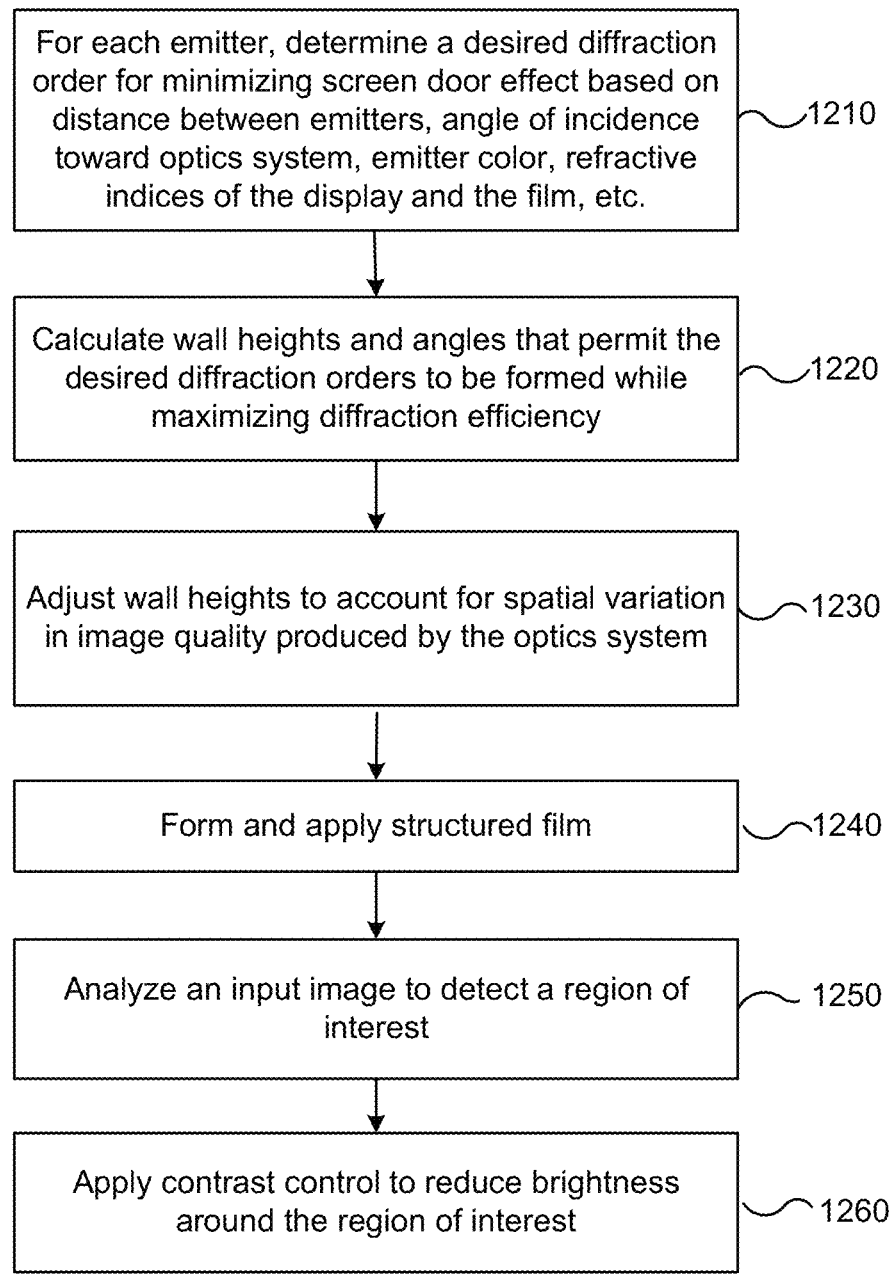
FIG. 12 is a flow diagram of a method for producing and applying a structured film, in accordance with an embodiment.

FIG. 12 is a flow diagram of a method 1200 for producing and applying a structured film. At step 1210, a desired diffraction order for minimizing SDE is determined for each emitter based on factors such as the distance between emitters, angle of incidence toward the optics system, emitter color (i.e., wavelength), and the refractive indices of the display and the film. In embodiments where an additional layer is placed over the film (e.g., an encapsulating layer) the refractive index of the additional layer can also be taken into consideration.

At step 1220, the wall heights and angles are calculated to permit the desired diffraction orders to be formed while maximizing diffraction efficiency at the desired diffraction orders.

At step 1230, the wall heights are adjusted to account for spatial variation in image quality (e.g., sharpness) produced by the optics system. In this way, the film can be designed to provide consistent image quality while maximizing the native resolution of the display.

At step 1240, the structured film is formed according to the adjusted wall heights and applied to the display.

At step 1250, an input image that is to be shown on the display is analyzed to detect a region of interest (e.g., a region containing a fine detail surrounded by a bright background).

At step 1260, contrast control is applied to reduce the brightness around the region of interest, e.g., by adjusting the dynamic range and/or the brightness of pixels around the region of interest.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device comprising:
   a display including a plurality of light emitters that are individually controllable to emit light; and
   a structured film attached to the display, wherein the structure film comprises an optically transmissive surface including a plurality of walls, the walls extending away from the display at different heights and surrounding the plurality of light emitters, wherein the structured film operates as a diffraction grating, and wherein the walls are configured to generate selected diffraction orders for each light emitter, including generating a diffraction order for a first light emitter and a diffraction order for a second light emitter adjacent to the first light emitter such that a predefined portion of light energy radiated by the first light emitter is permitted to spread toward the second light emitter.

2. The display device of claim 1, wherein the diffraction order for the first light emitter and the diffraction order for the second light emitter together at least partially cover a gap between the first light emitter and the second light emitter.

3. The display device of claim 1, wherein the plurality of walls include a first wall separating the first light emitter from the second light emitter, the first wall being configured to minimize interference between light energy radiated by the first light emitter and light energy radiated by the second light emitter.

4. The display device of claim 3, wherein the first wall is configured to prevent the diffraction order for the first light emitter from overwhelming the diffraction order for the second light emitter.

5. The display device of claim 1, wherein heights of the walls vary based on an image quality profile for an optics system that receives and processes light from the display.

6. The display device of claim 5, wherein the optics system includes at least one lens, and wherein the walls are higher in areas where the at least one lens produces a blurrier image and lower in areas where the at least one lens produces a sharper image.

7. The display device of claim 5, wherein the walls are oriented at different angles in accordance with angles of incidence of the display toward the optics system.

8. The display device of claim 1, wherein at least some of the walls are Gaussian shaped.

9. A system, comprising:
   a display including a plurality of light emitters;
   a display controller configured to perform contrast control, the contrast control comprising adjusting at least one of a dynamic range and a brightness of pixels formed by the light emitters; and
   a structured film attached to the display, wherein the structured film comprises an optically transmissive surface including a plurality of walls, the walls extending away from the display at different heights and surrounding the light emitters, wherein the structured film operates as a diffraction grating, and wherein the walls are configured to generate selected diffraction orders for each light emitter, including generating a diffraction order for a first light emitter and a diffraction order for a second light emitter adjacent to the first light emitter such that a predefined portion of light energy radiated by the first light emitter is permitted to spread toward the second light emitter.

10. The system of claim 9, wherein the display controller is configured to:
    identify a region of interest in an image to be formed on the display; and
    adjust a contrast of pixels in the region of interest relative to pixels in a surrounding region such that a brightness of the region of interest is increased relative to a brightness of the surrounding region.

11. The system of claim 10, wherein the region of interest is a darker region, and wherein the surrounding region is a brighter region.

12. The system of claim 9, wherein the diffraction order for the first light emitter and the diffraction order for the second light emitter together at least partially cover a gap between the first light emitter and the second light emitter.

13. The system of claim 9, wherein the plurality of walls include a first wall separating the first light emitter from the second light emitter, the first wall being configured to minimize interference between light energy radiated by the first light emitter and light energy radiated by the second light emitter.

14. A method of forming a structured film for a display, comprising:
    selecting diffraction orders for a plurality of light emitters of the display, including a diffraction order for a first light emitter and a diffraction order for a second light emitter adjacent to the first light emitter;
    calculating wall heights for generating the selected diffraction orders using a structured film including a plurality of walls, wherein when the structured film is placed in an operative position with respect to the display:
       the plurality of walls extend away from the display at different heights and surround the light emitters, and
       the structured film operates as a diffraction grating that generates the selected diffraction orders, including generating the diffraction order for the first light emitter and the diffraction order for the second light emitter such that a predefined portion of light energy radiated by the first light emitter is permitted to spread toward the second light emitter; and
    forming the structured film using an optically transmissive material and according to the calculated wall heights.

15. The method of claim 14, wherein the diffraction order for the first light emitter and the diffraction order for the second light emitter are selected to together at least partially cover a gap between the first light emitter and the second light emitter.

16. The method of claim 14, wherein the height of a first wall separating the first light emitter from the second light emitter is calculated to minimize interference between light energy radiated by the first light emitter and light energy radiated by the second light emitter.

17. The method of claim 16, wherein the height of the first wall is calculated to prevent the diffraction order for the first light emitter from overwhelming the diffraction order for the second light emitter.

18. The method of claim 14, further comprising:
    adjusting the calculated wall heights to account for spatial variations in image quality produced by an optics system that receives and processes light from the display.

19. The method of claim 18, wherein the optics system includes at least one lens, and wherein the calculated wall heights are adjusted to be higher in areas where the at least one lens produces a blurrier image and lower in areas where the at least one lens produces a sharper image.

20. The method of claim 18, further comprising:
setting the walls at different angles in accordance with angles of incidence of the display toward the optics system.

* * * * *